United States Patent
Acharya et al.

(10) Patent No.: US 9,578,602 B1
(45) Date of Patent: Feb. 21, 2017

(54) DEVICE AWARE SOCIAL GRAPHS

(75) Inventors: Anish Acharya, Toronto (CA); Jeson Patel, Concord (CA)

(73) Assignee: Google Inc., Mountain View, CA (US)

( * ) Notice: Subject to any disclaimer, the term of this patent is extended or adjusted under 35 U.S.C. 154(b) by 604 days.

(21) Appl. No.: 13/419,606

(22) Filed: Mar. 14, 2012

Related U.S. Application Data

(60) Provisional application No. 61/452,677, filed on Mar. 15, 2011.

(51) Int. Cl.
| | | |
|---|---|---|
| G06F 15/16 | (2006.01) | |
| G06F 7/00 | (2006.01) | |
| H04N 7/10 | (2006.01) | |
| H04W 52/02 | (2009.01) | |
| H04M 15/00 | (2006.01) | |

(52) U.S. Cl.
CPC ......... H04W 52/0258 (2013.01); H04M 15/58 (2013.01)

(58) Field of Classification Search
CPC . H04L 63/102; H04L 41/5051; H04M 15/723; H04M 15/61; H04W 4/26
USPC ........................................................ 709/204
See application file for complete search history.

(56) References Cited

U.S. PATENT DOCUMENTS

| | | | |
|---|---|---|---|
| 8,204,952 B2* | 6/2012 | Stremel et al. | 709/213 |
| 8,543,144 B2* | 9/2013 | Wosk et al. | 455/466 |
| 9,204,282 B2* | 12/2015 | Raleigh | H04L 12/14 |
| 9,319,993 B1* | 4/2016 | Urbanus | H04W 52/22 |
| 2003/0043992 A1* | 3/2003 | Wengrovitz | H04M 7/009 379/229 |
| 2005/0114781 A1* | 5/2005 | Brownholtz et al. | 715/733 |
| 2008/0243699 A1* | 10/2008 | Hilerio et al. | 705/59 |
| 2010/0325249 A1* | 12/2010 | Brunson | H04L 29/12122 709/221 |
| 2011/0117881 A1* | 5/2011 | Luoma et al. | 455/410 |
| 2011/0231396 A1* | 9/2011 | Dhara et al. | 707/731 |
| 2012/0143921 A1* | 6/2012 | Wilson et al. | 707/798 |
| 2015/0207686 A1* | 7/2015 | Raleigh | H04L 41/0893 370/329 |

* cited by examiner

*Primary Examiner* — Arvin Eskandarnia
*Assistant Examiner* — Margishi Desai
(74) *Attorney, Agent, or Firm* — IP Spring

(57) ABSTRACT

Methods, systems, and apparatus, including computer programs encoded on a computer storage medium, for a device aware social graph. In one aspect, a method includes identifying a first member of a social graph, the first member associated with a first device. The method includes identifying a second member of a social graph, the second user associated with a second device and having a relationship in the social graph with the first member. The method includes identifying a service accessed by the second member using the second device. The method includes determining that the first device is compatible with the service. The method also includes offering the service to the first member.

17 Claims, 5 Drawing Sheets

DEVICE AWARE SOCIAL GRAPHS

CROSS-REFERENCE TO RELATED APPLICATIONS

This application claims priority to U.S. Provisional Application Ser. No. 61/452,677, filed on Mar. 15, 2011, entitled "Device Aware Social Graphs," the entire contents of which are hereby incorporated by reference.

BACKGROUND

This specification relates to social affinity groups.

Many users throughout the world access the Internet and communicate with each other either directly or indirectly by use of the Internet.

Any particular user using the Internet may have many different relationships with many other users, and these relationships may be explicit or implicit. For example, social network sites are web sites that enable users to establish and track explicit relationships between the user and other users of the social network site or users within a same geographic region.

SUMMARY

This specification describes technologies relating to social graphs.

In general, one innovative aspect of the subject matter described in this specification can be embodied in methods that include the actions of identifying a first member of a social graph, the first member associated with a first device. The method includes the actions of identifying a second member of a social graph, the second user associated with a second device and having a relationship in the social graph with the first member. The method includes the actions of identifying a service accessed by the second member using the second device. The method includes the actions of determining that the first device is compatible with the service. The method also includes the actions of offering the service to the first member.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. The service may be offered to the first member based further on capabilities of the first device. The first device may be associated with a usage pattern based on interactions between a corresponding member and device. The service may be offered to the first member based further on usage patterns of the first device. The method may include the actions of identifying a communication between the first member and a second member of the social graph; and storing information describing a first device used by the first member and a second user device used by the second member during the communication. The one or more services may be offered to the first member based on the communication. Offering the one or more services to the first member may include identifying one or more other members of the social graph who have devices compatible with the one or more services.

Particular embodiments of the subject matter described in this specification can be implemented so as to realize one or more of the following advantages. Applications can be developed that are customized to the devices of the user.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
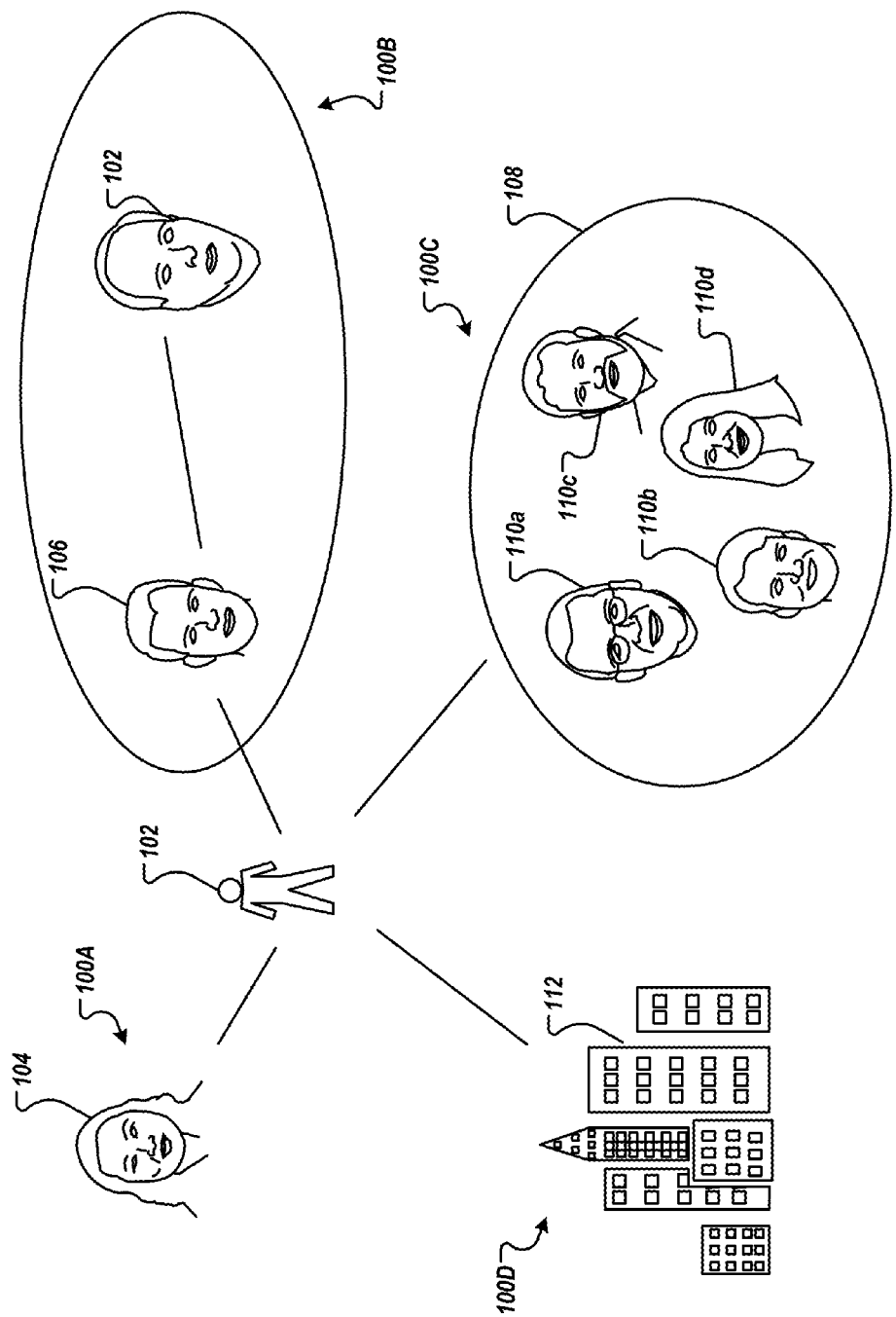
FIG. 1 illustrates an example of social affinity groups of a user.

FIG. 1 illustrates an example of social affinity groups of a user 102. The social affinity group 100A of the user 102 includes a first friend 104 identified by the user 102. The user 102 can identify the first friend 104 in, for example, a user profile. A user profile can include, for example, a list of the members of the user's social affinity group. The profile may be, for example, a user's profile for a blog, or a profile for a social network. For the former, the social affinity group may include followers of the user's blog. In the case of the latter, the user profile can include information that identifies social network services in which the user participates.

Generally, a social network service enables users to establish social relationships with other users of the social network service. The social affinity group 100B of the user 102 also includes a second friend 106 related to the user 102 on a social network service. In some implementation, the user 102 identifies himself as a member of a social network service. The social network service can be examined, for example, with permission from the user 102, to identify the user's friends on the social network service (e.g. the second friend 106).

The user 102 is related to a group 108 of co-workers 110*a*, 110*b*, 110*c*, 110*d* based on place of employment. This relationship establishes another social affinity group 100C. In some implementations, the user 102 identifies himself as an employee of a company. With permission of the user, the user can then be identified with a group of others employed by the same company (who grant similar permission), e.g., by use of an LDAP database. In other implementations, the user 102 can identify the co-workers 110*a*, 110*b*, 110*c*, and 110*d* as being members of the group 108 in the user profile. Other groups can also be identified, for example, classmates, fraternity/sorority members, club memberships, professional organizations, social clubs, fan clubs, etc.

The user 102 is also related to others in the same city, town, or geographical area 112, and this relationship establishes another social affinity group 100D. In some implementations, the city, town, or geographical area 112 can be identified based on IP address. In other implementations, the city, town, or geographical area 112 is identified in the user profile.

The social affinity groups 100 of the user 102 can also include other users indirectly related to the user 102. For example, the social affinity group 100B of the user 102 is an individual 114 who is indirectly related to the user 102 through the second friend 106 of the user.

The social affinity groups 100 can also include others who have other relationships with the user 102. For example, in some implementations, a social affinity group of the user can include contributors to blogs or micro-blogs to which the user subscribes. In some implementations, a social affinity group of the user can include others with whom the user has had email correspondence, others identified in the users address book, and others in an instant messaging contact list. Other social affinity groups can be established by common attributes (e.g., subscribers to a service, users that have similar content/topical preferences, etc.). In some implementations, a social affinity group of the user can include others who share common keywords in their profile (for example, they both list the same favorite band.).

In some implementations, social affinity groups change over time. A user may move to another city, change the keywords in their profile, or change who is listed as a friend in their profile. For example, a user may change the name of their favorite band in their profile, and consequently change implicit members of their social affinity group. In some implementations, the social affinity group for a user may be continually updated. In other implementations, the social affinity group for a user may be updated periodically (e.g. every ten minutes, even half hour, every hour, or once a day).

Social affinity groups can be aggregated to form social graphs. Where social affinity groups are centered around a user (for example, the user 102 of FIG. 2), a social graph reflects the relationships of several users.

Figure 2:
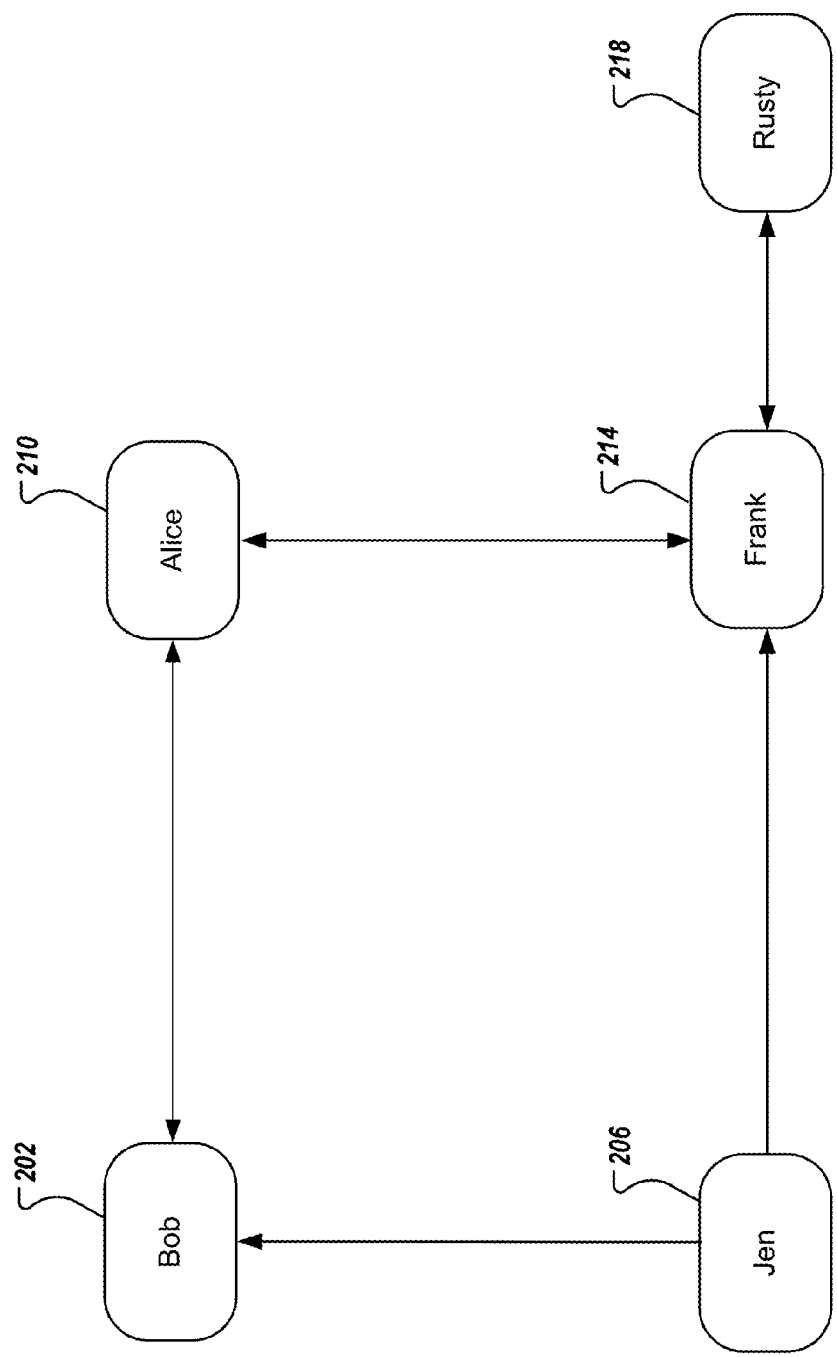
FIG. 2 illustrates an example of a social graph.

FIG. 2 illustrates an example of a social graph. A user "Bob" 202 is socially connected to a user "Alice" 210. "Jen" is socially connected to "Bob" 222 and "Frank" 214. "Frank" 214 is socially connected to "Alice" 210 and "Rusty" "216". Members of a social graph may have information associated with them, for example, devices used to access the social graph.

Connections in a social graph can be bidirectional. Here, the relationship between "Bob" 202 and "Alice" 210 is bidirectional, for example "Bob" 202 and "Alice" 210 may have established a mutual social relationship on a social networking site. Connections in the social graph can also be unidirectional. Here, "Jen" 206 has a unidirectional relationship with "Bob" 202 and "Frank" 214. Unidirectional relationships can be created, for example, by "Jen" 206 by subscribing to a micro-blog authored by "Bob" 202.

Socially enabled applications can be developed to incorporate the relationships and information described by the social graph. For example, a socially enabled application can be written to allow a user to select a subset of users (e.g. "best friends") from a list of all friends on a social networking site.

Using mobile devices, users may access a social networking site or other socially enabled application from a variety of heterogeneous devices. In some examples, certain user experiences depend on users using either a common device or a common group of devices. Socially enabled applications can be built using device specific client interfaces that install on the mobile device.

Different mobile devices have different capabilities. As a result, the experience of a user on one kind of mobile device may be different from the experience of another user on a different kind of mobile device. For example, a social application that involves taking a photo and sending the photo to another user in the social graph may be device specific (e.g. the social application works if the user has a camera on their mobile device and the recipient has a mobile device with a screen capable of viewing the photo). Information identifying devices used by users in the social graph can be stored.

Figure 3:
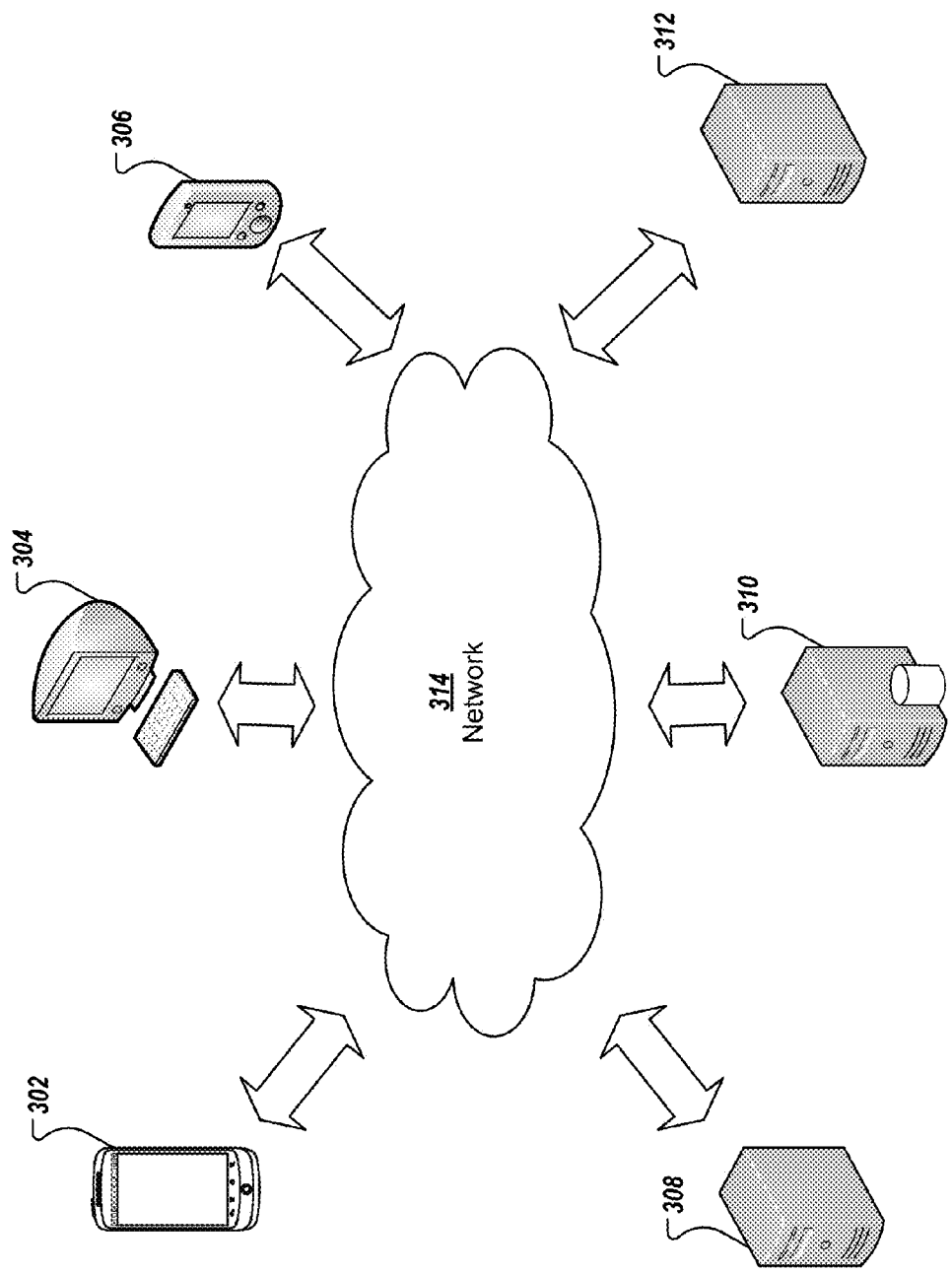
FIG. 3. illustrates an example of an environment in which a social graph may be built and utilized.

FIG. 3. illustrates an example environment in which a social graph may be built and utilized. Users interact with services provided over a network using a variety of different devices. For example a user may use a smart phone 302, a personal computer 304, or a tablet 306 or other device. The user connects with services provided over a network 314 such as the Internet. For example, the user may access a social networking site 308 or a blog or micro-blog site 312. A social graph system 310 can develop a social graph based on information provided by the users and by the application. For example, a user may provide a list of the user's social and professional contacts. A user may also provide information describing the user to the system, for example the user may provide his age, birthday, name, address, e-mail address, etc.

Figure 4:
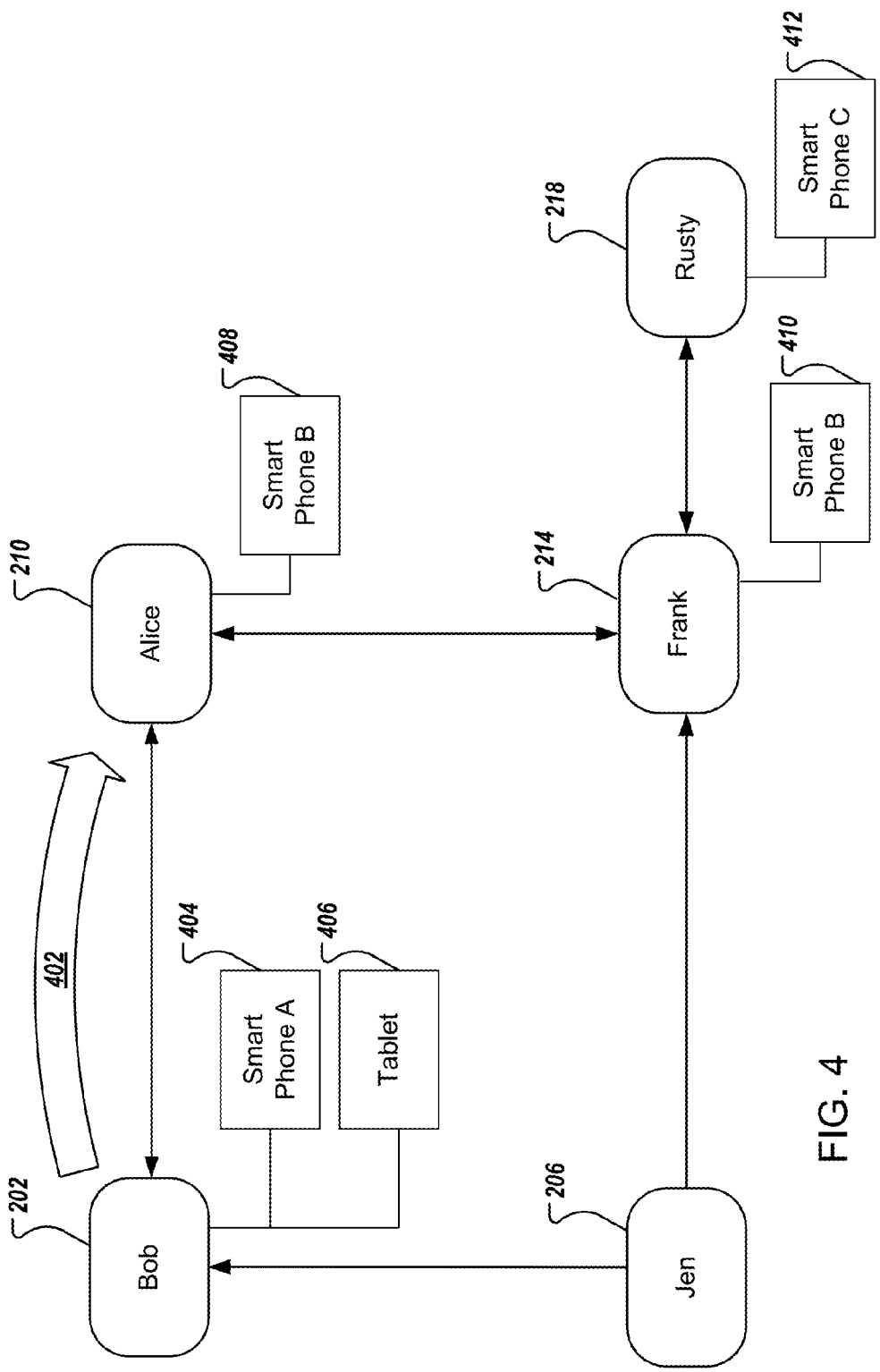
FIG. 4 illustrates an example of storing information in a social graph.

FIG. 4 illustrates an example of storing information in a social graph. "Bob" 202 has a Smart Phone Type A device 404 and "Alice" 210 has a Smart Phone Type B device 408. "Bob" 202 also has a tablet device 406.

In some implementations, a social graph service, for example, a service executing on the social graph server 310 of FIG. 3, can store information about how members of the social graph interact with services provided by the social graph and each other. For example, the social graph service may identify that "Bob" 202 uses his smart phone type A 404 to access a socially aware chat application. The social graph service may identify that "Alice" accesses the same chat application using her smart phone type B 408. The social graph service can store information specific to the socially enabled applications of the user. For example, the social graph service can store the chat identifier of "Bob" and "Alice". Further, represented by process arrow 402, the social graph service may identify and store that "Bob" 202 and "Alice" 210 communicated using the socially aware chat application.

In some implementations, the social graph service stores information particular to the devices used by the users. For example the social graph service may store one set of information for the smart phone type A 404 and a different set of information for the smart phone type B 408. The social graph service connects "Bob" and "Alice" in the context of all of their respective devices. So, "Bob"'s node in the social graph would contain information specific to his devices (Smart Phone Type A, chat application, Tablet) and "Alice"'s node would have device specific information respective to her devices (Smart Phone Type B, chat application).

The social graph service can add a device to the social graph when a user interacts with the social graph service or a socially enabled application. The social graph service adds the new device to the list of devices associated with that user. In some implementations, different instances of a given device are associated with a user in the graph. So, if a user has several Smart Phone devices, for example, the social graph service would be aware of those devices and associate them with the relevant node in the network.

For situations in which the systems discussed here collect information about users, the users may be provided with an opportunity to opt in/out of programs or features that may collect information (e.g., information about a user's preferences, a user's contributions to social content providers, user's devices, etc.).

In some implementations, the social graph service identifies or determines usage patterns associated with devices. For example, the social graph service identifies or determines that "Bob" 202 uses his smart phone type A 404 during the workday, and his tablet 406 in the evenings and on weekends. In some implementations, a social graph service can route messages from a socially enabled application to a particular device based on the usage pattern. For example, a chat request sent during the day may be routed to "Bob"'s smartphone type A 404, while a similar request received at night may be routed to his tablet 406.

In some implementations, socially enabled applications can customize their use experience based on the information stored by the social graph service. For example, if "Alice" 210 invites "Frank" 214 to use a chat application, the chat application may consult the social graph service and identify that "Frank" 214 has a smart phone type B. The invitation sent to "Frank" may contain a link or other information that directs "Frank" to the appropriate version of the chat application for his device. In some implementations, an application only offers services to users that are supported on their device. For example, if the chat application does not support the "Smart Phone Type C" 412 owned by "Rusty", "Frank" will not be presented with the option to invite "Rusty" to the chat application. In other implementations, "Frank" may be notified that "Rusty" does not have a compatible device.

Figure 5:
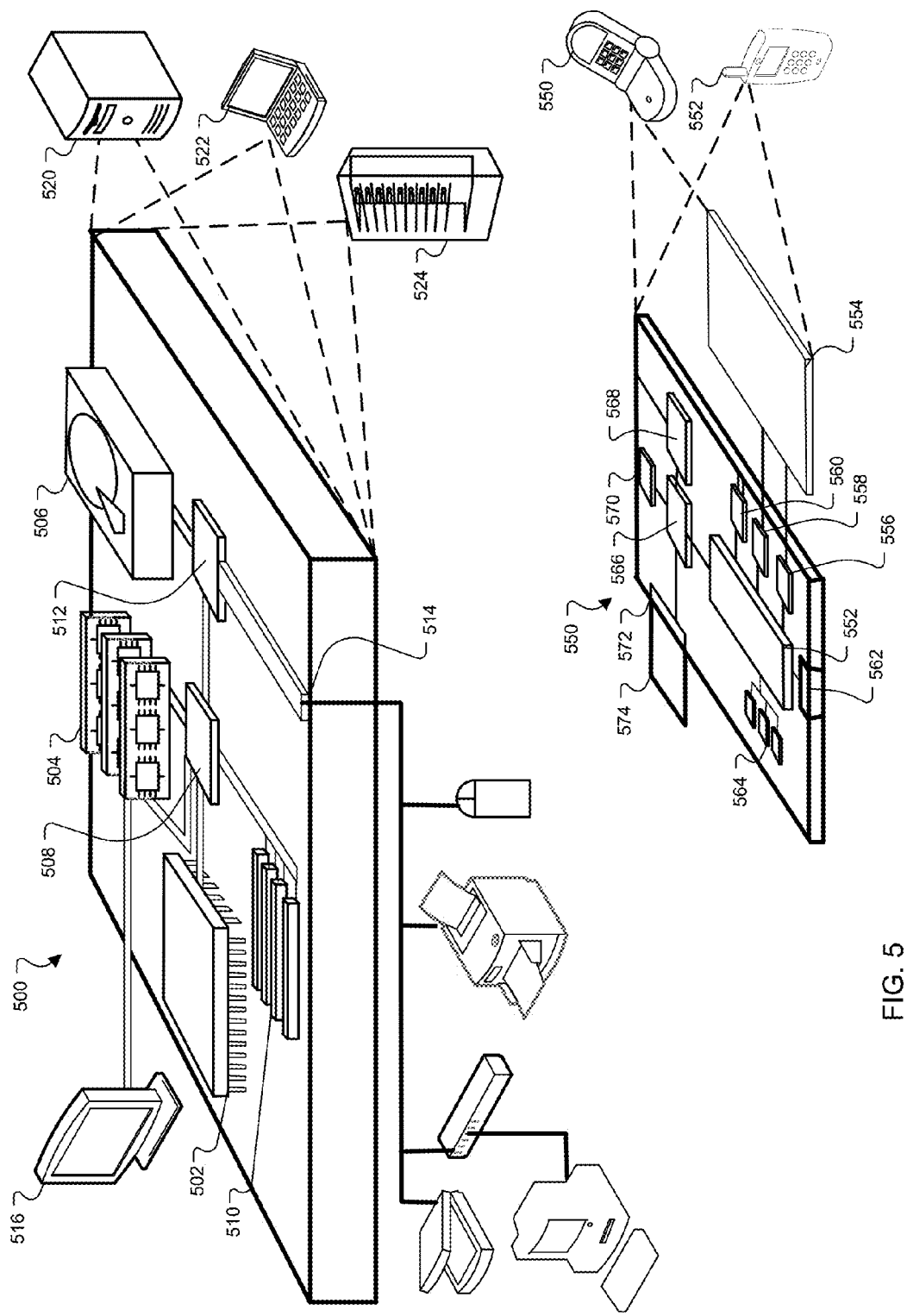
FIG. 5 is a block diagram of computing devices that may be used to implement the systems and methods described in this document, as either a client or as a server or plurality of servers.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of social network graphs and methods have been described, it should be recognized that numerous other applications are contemplated. Accordingly, other embodiments are within the scope of the following claims.

What is claimed is:

1. A method performed by data processing apparatus, the method comprising:
   identifying a first member of a social graph, the first member having a first device and a third device;
   identifying a second member of the social graph, the second member having a second device and having a relationship in the social graph with the first member;
   identifying a service accessed by the second member using the second device;
   determining capability of the first device and capability of the third device to use the service by retrieving stored first device capability data and stored third device capability data, wherein the stored first device capability data includes, at least in part, different information than the stored third device capability data;
   predicting which of the first device and the third device will likely be in use at an offering time of day for the service based on accessing a stored time of day usage history of the first device and a stored time of day usage history of the third device and comparing the time of day usage history of the first device and the time of day usage history of the third device with the offering time; and
   offering the service to the first member at the offering time on at least one of the first device and the third device based on the capability of the first device and the capability of the third device to use the service and which of the first device and the third device is predicted to likely be in use at the offering time.

2. The method of claim 1, further comprising:
   identifying a communication between the first member and the second member of the social graph; and
   storing information describing the first device and the third device used by the first member and the second device used by the second member during the communication.

3. The method of claim 2, wherein the service is a socially enabled application and the service is offered to the first member based on the communication.

4. The method of claim 2, wherein the stored information includes one or more available services on the first device, one or more available services on the second device, and one or more available services on the third device.

5. The method of claim 1, wherein offering the service to the first member comprises identifying one or more other members of the social graph who have devices compatible with the service.

6. The method of claim 1, wherein predicting which of the first device and the third device will likely be in use at an offering time of day for the service further includes determining a usage pattern for the first device based, at least in part, on the stored time of day usage history of the first device and determining a usage pattern for the third device based, at least in part, on the stored time of day usage history of the third device.

7. A computer storage device encoded with computer program instructions that when executed by one or more computers cause the one or more computers to perform operations comprising:
   identifying a first member of a social graph, the first member associated with a first device and a third device;
   identifying a second member of the social graph, the second member associated with a second device and having a relationship in the social graph with the first member;
   identifying a service accessed by the second member using the second device;
   determining capability of the first device and capability the third device to use the service by retrieving stored first device capability data and stored third device capability data, wherein the stored first device capability data includes, at least in part, different information than the stored third device capability data;
   comparing the capability of the first device and the capability of the third device;
   predicting which of the first device and the third device will likely be in use at an offering time of day for the service based on accessing a stored time of day usage history of the first device and a stored time of day usage history of the third device and comparing the time of day usage history of the first device and the time of day usage history of the third device with the offering time;
   providing a notification to the second member of the capability of at least one of the first device and third device with the service; and
   offering the service to the first member at the offering time on at least one of the first device and the third device based on the comparing of the capability of the first device and the capability of the third device to use the service and which of the first device and the third device is predicted to likely be in use at the offering time.

8. The computer storage device of claim 7, wherein the computer storage device is further encoded with computer program instructions that when executed by one or more computers cause the one or more computers to perform operations further comprising:
   identifying a communication between the first member and the second member of the social graph; and
   storing information describing the first device and the third device used by the first member and the second device used by the second member during the communication.

9. The computer storage device of claim 8, wherein the service is offered to the first member based on the communication.

10. The computer storage device of claim 8, wherein the stored information includes one or more available services on the first device, one or more available services on the second device, and one or more available services on the third device.

11. The computer storage device of claim 7, wherein offering the services to the first member comprises identifying one or more other members of the social graph who have devices compatible with the service.

12. The computer storage device of claim 7, wherein predicting which of the first device and the third device will likely be in use at an offering time of day for the service further includes determining a usage pattern for the first device based, at least in part, on the stored time of day usage history of the first device and determining a usage pattern for the third device based, at least in part, on the stored time of day usage history of the third device.

13. A system comprising:
one or more computers and one or more storage devices storing instructions that are operable, when executed by the one or more computers, to cause the one or more computers to perform operations comprising:
identifying a first member of a social graph, the first member associated with a first device and a third device;
identifying a second member of the social graph, the second member associated with a second device and having a relationship in the social graph with the first member;
identifying a service accessed by the second member using the second device;
determining that both the first device and the third device are capable to use the service by retrieving stored first device capability data and stored third device capability data, wherein the stored first device capability data includes in part, different information than the stored third device capability data;
predicting which of the first device and the third device will likely be in use at an offering time of day for the service based on accessing a stored time of day usage history of the first device and a stored time of day usage history of the third device and comparing the time of day usage history of the first device and the time of day usage history of the third device with the offering time; and
offering the service to the first member at the offering time on at least one of the first device and the third device based on stored information including stored first device capability data and stored third device capability data and based on which of the first device and the third device is predicted to likely be in use at the offering time.

14. The system of claim 13, wherein the one or more storage devices further store instructions that are operable, when executed by the one or more computers, to cause the one or more computers to perform operations comprising:
identifying a communication between the first member and the second member of the social graph; and
storing information describing the first device and the third device used by the first member and the second device used by the second member during the communication.

15. The system of claim 14, wherein the service is a socially enabled application and the service is offered to the first member based on the communication.

16. The system of claim 13, wherein offering the service to the first member comprises identifying one or more other members of the social graph who have devices compatible with the service.

17. The system of claim 13, wherein predicting which of the first device and the third device will likely be in use at an offering time of day for the service further includes determining a usage pattern for the first device based, at least in part, on the stored time of day usage history of the first device and determining a usage pattern for the third device based, at least in part, on the stored time of day usage history of the third device.

* * * * *